United States Patent
Watada et al.

(10) Patent No.: US 6,791,043 B2
(45) Date of Patent: Sep. 14, 2004

(54) POSITIONING METHOD AND POSITIONING STRUCTURE OF INHIBITOR SWITCH

(75) Inventors: Tsutomu Watada, Tokyo (JP); Takashi Nakazawa, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 10/092,493

(22) Filed: Mar. 8, 2002

(65) Prior Publication Data

US 2002/0130021 A1 Sep. 19, 2002

(30) Foreign Application Priority Data

Mar. 16, 2001 (JP) .................................... 2001-075269

(51) Int. Cl.$^7$ ................................................ H01H 9/06
(52) U.S. Cl. ...................................................... 200/61.88
(58) Field of Search ..................................... 200/61.88

(56) References Cited

U.S. PATENT DOCUMENTS

| | | | |
|---|---|---|---|
| 4,603,240 A | * | 7/1986 | Hayasaki ............. 200/61.88 X |
| 5,828,022 A | | 10/1998 | Nakazawa et al. ....... 200/61.88 |
| 5,828,023 A | | 10/1998 | Nakazawa |
| 5,977,496 A | * | 11/1999 | Halberg et al. .......... 200/61.88 |

FOREIGN PATENT DOCUMENTS

| | | |
|---|---|---|
| EP | 1251535 A | 10/2002 |
| GB | 2349744 A | 8/2000 |
| JP | 8-74978 | 3/1996 |

\* cited by examiner

*Primary Examiner*—Renee Luebke
(74) *Attorney, Agent, or Firm*—Rader, Fishman & Grauer PLLC

(57) ABSTRACT

To make it possible to facilitate accurate positioning of an inhibitor switch with respect to an automatic transmission, there is provided a tack-fastening member, which is mounted in advance between a terminal block and a moving block before an inhibitor switch is fixed on an automatic transmission, for tack-fastening the terminal block and moving block at a corresponding rotational position to detect a specific shift position of the automatic transmission, and for being broken at a set torque. By this tack-fastening member, the moving block is temporarily fastened on the terminal block, and the moving block in the temporarily fastened state is fitted on a manual shaft at the specific shift position. After this, the inhibitor switch is fixed on the automatic transmission, and the manual shaft is rotated to break the tack-fastening member from the temporarily fastened state.

12 Claims, 7 Drawing Sheets

POSITIONING METHOD AND POSITIONING STRUCTURE OF INHIBITOR SWITCH

BACKGROUND OF THE INVENTION

1. Field of the Invention

The present invention relates to an inhibitor switch and to a positioning method and a positioning structure for mounting the inhibitor switch on an automatic transmission.

2. Description of the Related Art

A positioning method and a positioning structure for an inhibitor switch of the prior art are described in Unexamined Published Japanese Patent Application No. 8-74978 and shown in FIG. 9 and FIG. 10, for example. FIG. 9 is a perspective view showing the entirety of the inhibitor switch, and FIG. 10 is a sectional view showing the same.

As shown in FIG. 9 and FIG. 10, an inhibitor switch 101 is provided with a terminal block 103, a case 105 and a moving block 107. The terminal block 103 is equipped with a plurality of stationary terminals 109. The terminal block 103 is equipped with a positioning hole 113. The case 105 is bonded to the terminal block 103 by fusing it. The case 105 is equipped with slots 115 for fastening and fixing purposes.

The moving block 107 is equipped with moving contacts 111. The moving block 107 is rotatably supported by the terminal block 103 and the case 105. The moving block 107 is equipped with a fitting hole 121 to be fitted on a manual shaft 117 of the automatic transmission.

This inhibitor switch 101 is mounted by fitting the fitting hole 121 of the moving block 107 on the manual shaft 117 of the automatic transmission and by fastening the not-shown bolts inserted in the slots 115 to the housing side of the automatic transmission. At the time of mounting this inhibitor switch 101, an adjustment is made to align the detected position of the inhibitor switch 101 and a specific shift position according to the rotation of the manual shaft 117. This specific shift position is located, for example, at a neutral position (or N-position) of the automatic transmission.

For this adjustment, with the bolts to be fastened in the slots 115 being loosened, the entire inhibitor switch 101 is made rotatable within the range of the slots 115 with respect to the manual shaft 117. A hole 119a with a width across the flats of a positioning jig 119 is fitted on a fitting portion 117a with a width across the flats at the leading end of the manual shaft 117. Next, the entire inhibitor switch 111 is turned, and the positioning pin 119b of the positioning jig 119 is inserted into the positioning hole 113 of the terminal block 103. In this state, the bolts in the two slots 115 are fastened to fix the inhibitor switch 101 on the housing of the automatic transmission.

By the aforementioned fastening work using the positioning jig 119, therefore, the moving block 107 and the terminal block 103 are accurately adjusted to the N-position of the manual shaft 117, so that the inhibitor switch 101 can be reliably fixed in the accurately positioned state with respect to the manual shaft 117.

By the aforementioned positioning method and positioning structure of the inhibitor switch, however, during the stage in which the inhibitor switch 101 is assembled with the automatic transmission, the positioning adjustment has to be made by using the positioning jig 119, thereby causing the assembling work of the inhibitor switch 101 to increase in complexity.

SUMMARY OF THE INVENTION

An object of the present invention is to provide an inhibitor switch positioning method and structure, which can assemble an inhibitor switch in an accurately positioned state with an automatic transmission without any positioning adjustment.

According to one aspect of the invention, there is provided a positioning structure of an inhibitor switch including: a switch housing having a terminal block having stationary contacts and a cover; and a moving block fitted on a manual shaft of an automatic transmission and having a fitting hole and moving contacts for rotating with respect to the switch housing, wherein the inhibitor switch is fixed on the housing of the automatic transmission for detecting the shift position of the automatic transmission electrically from a rotational position corresponding to a relationship between the stationary contacts and the moving contacts in accordance with the rotation of the manual shaft of the automatic transmission. In the positioning structure, the switch housing and the moving block can be temporarily fastened by a tack-fastening member to be broken at a set torque, before the inhibitor switch is fixed on the automatic transmission, at corresponding rotation positions for detecting a specific shift position of the automatic transmission.

Therefore, it is possible to accurately position the corresponding rotation positions for detecting the specific shift position of the automatic transmission between the switch housing and the moving block.

After the moving block in this temporarily fastened state is fitted on the manual shaft at the specific shift position, the inhibitor switch can be fixed on the automatic transmission.

Therefore, it is possible to accurately position the specific shift position of the manual shaft and the corresponding rotation positions of the switch housing and the moving block for detecting the specific shift position. In this state, moreover, the inhibitor switch is fixed on the automatic transmission so that the positional relationship between the switch housing and the moving block and the manual shaft can be accurately determined.

After this, the temporarily fastened state can be released by rotating the manual shaft to break the easily broken portions.

Therefore, the inhibitor switch can be brought into a using state without any special work.

Thus, at the time of mounting the inhibitor switch, the inhibitor switch can be accurately assembled with extreme ease with the automatic transmission without any special positioning work using a jig.

According to another aspect of the invention, there is provided a positioning structure of an inhibitor switch including: a switch housing having a terminal block having stationary contacts; and a moving block fitted on a manual shaft of an automatic transmission and having a fitting hole and moving contacts for rotating with respect to the terminal block, wherein the inhibitor switch is fixed on the housing of the automatic transmission for detecting the shift position of the automatic transmission electrically from a rotational position corresponding to a relationship between the stationary contacts and the moving contacts in accordance with the rotation of the manual shaft of the automatic transmission. The terminal block and the moving block can be temporarily fastened by a tack-fastening member to be broken at a set torque, in advance before the inhibitor switch is fixed on the automatic transmission, at corresponding rotation positions for detecting a specific shift position of the automatic transmission and adapted to be broken at a set torque.

Therefore, it is possible to accurately position the corresponding rotation positions for detecting the specific shift position of the automatic transmission between the terminal block and the moving block.

After the moving block in this temporarily fastened state is fitted on the manual shaft at the specific shift position, the inhibitor switch can be fixed on the automatic transmission.

Therefore, it is possible to accurately position the specific shift position of the manual shaft and the corresponding rotation positions of the terminal block and the moving block for detecting the specific shift position. In this state, moreover, the inhibitor switch is fixed on the automatic transmission so that the positional relationship between the terminal block and the moving block and the manual shaft can be accurately determined.

After this, the temporarily fastened state can be released by rotating the manual shaft to break the easily broken portions.

Therefore, the inhibitor switch can be brought into a using state without any special work.

Thus, at the time of mounting the inhibitor switch, the inhibitor switch can be accurately assembled with extreme ease with the automatic transmission without any special positioning work using a jig.

In addition, according to still another aspect of the invention, the tack-fastening member is made of a resin and includes: a first fixed portion to be fixed on the side of the terminal block; a second fixed portion to be fixed on the side of the moving block; and an easily broken portion for connecting the first and second fixed portions. The corresponding rotation positions of the terminal block and the moving block can be temporarily fastened reliably by the tack-fastening member.

When the manual shaft is rotated after the assembly, moreover, the second fixed portion on the moving block side rotates with respect to the first fixed portion on the terminal block side so that the easily broken portion can be broken at the set torque. As a result, the inhibitor switch can be easily brought into the using state. Moreover, the first and second fixed portions and the easily broken portion can be integrally molded of resin with ease.

In addition, according to still another aspect of the invention, the first and second fixed portions are formed into a ring shape generally concentric to the fitting hole of the moving block, and the easily broken portion is provided in plurality in the circumferential directions between the first and second fixed portions. Therefore, the easily broken portions can be individually thinned and can be reliably broken at the set torque while suppressing their flexibility.

In addition, according to still another aspect of the invention, the first fixed portion is equipped with an outer press-fit portion, and the second fixed portion is equipped with an inner press-fit portion; the terminal block is equipped with an output press-fitting accommodating portion for press-fitting the output press-fit portion, and the moving block is equipped with an inner press-fitting accommodating portion for press-fitting the inner press-fit portion; and each of the press-fit portions has a crushing strength set higher than the strength of the easily broken portions. While the tack-fastening member is being reliably fixed by the press-fitting operation in the terminal block and the moving block, therefore, the easily broken portions can be reliably broken without inviting any looseness in the press-fits.

In addition, according to still another aspect of the invention, the terminal block is equipped with an inward circumference that abuts the outer circumference of the ring-shaped first fixed portion, and the moving block is equipped with an outward circumference that abuts the inner circumference of the ring-shaped second fixed portion, and an accommodating recess for accommodating the first and second fixed portions is formed between the inward circumference and the outward circumference. Therefore, the first and second fixed portions are accommodated in the accommodating recess so that the outer circumference of the first fixed portion abuts the inward circumference of the terminal block and so that the inner circumference of the second fixed portion abuts the outward circumference of the moving block.

When the easily broken portions are broken, therefore, the first fixed portion and the second fixed portion are to be deformed outward and inward, respectively. By the inward circumference and the outward circumference, however, the first and second fixed portions are supported and prevented from being deformed to transmit the breaking force reliably to the easily broken portions thereby to break them accurately at the set torque.

In addition, according to still another aspect of the invention, the first fixed portion is equipped separately of the outer press-fit portion with outer fastening portions to be fastened and fixed on the side of the terminal block, and the second fixed portion is equipped separately of the inner press-fit portion with inner fastening portions to be fastened and fixed on the side of the moving block, and the outer fastening portions are additionally thermally fastened and fixed on the side of the terminal block, and the inner fastening portions are additionally thermally fastened and fixed on the side of the moving block. Even after the easily broken portions were broken, therefore, the first fixed portion can be held on the terminal block, and the second fixed portion can be held on the moving block, so that the dust can be prevented from being accumulated.

Upon the outer press-fit portions and the inner press-fit portions, moreover, the thermal influences of the additional thermal fastening operations of the outer fastening portions and the inner fastening portions can be suppressed to suppress the looseness due to the thermal influences of the outer press-fit portions and the inner press-fit portions. Therefore, the easily broken portions can be reliably broken.

In addition, according to still another aspect of the invention, the outer press-fitting accommodating portions, the inner press-fitting accommodating portions and the accommodating recess are opened to the outer faces of the terminal block and the moving block. Therefore, the tack-fastening member can be easily mounted. Even if the tack-fastening member should come after being broken, moreover, it would go out of the inhibitor switch so that it would not trouble the function of the inhibitor switch.

In addition, according to still another of the invention, the easily broken portions are interposed in plurality at different spacings in the circumferential directions between the first and second fixed portions. When the inhibitor switch is used after the easily broken portions are broken, the intervals at which the individual broken faces of the easily broken portions of the first and second fixed portions simultaneously touch in the rotational direction when the second fixed portion is rotated with respect to the first fixed portion by the rotation of the moving block accompanying the rotation of the manual shaft are suppressed only one time for a rotation of 360 degrees. At the point just after being broken, even the broken faces of the easily broken portions of the first and second fixed portions contact each other and the states of simultaneous contact and no contact are not repeated so that the fluctuation of the operation torque can be drastically suppressed.

In addition, according to still another aspect of the invention, the easily broken portions are gradually thinned from both of the first fixed portion and the second fixed portion to the others to form stress-concentrated portions at their intermediate portions. When the second fixed portion rotates with respect to the first fixed portion, therefore, the shearing stress is concentrated at the stress concentrated portions of the easily broken portions to break the easily broken portions easily and reliably at the set torque at the stress concentrated portions. The broken faces of the easily broken portions can be easily extended along the directions of the corresponding rotations of the first and second fixed portions. When the second fixed portion rotates with respect to the first fixed portion, the broken faces at the easily broken portions of the first and second fixed portions can be suppressed from contacting to prevent the fluctuation of the operation torque more reliably.

BRIEF DESCRIPTION OF THE DRAWINGS

FIG. 6 relates to one embodiment, of which:

FIG. 6A is an enlarged top plan view of an essential portion showing an easily broken portion;

FIG. 6B is a sectional view of a stress concentrated portion;

FIG. 6C is an enlarged top plan view of an essential portion after the easily broken portion was broken;

FIG. 6D is an enlarged top plan view of an essential portion showing an easily broken portion having no stress concentrated portion; and FIG. 6E is an enlarged top plan view of an essential portion showing the stress concentrated portion broken;

DESCRIPTION OF THE PREFERRED EMBODIMENTS

Figure 1:
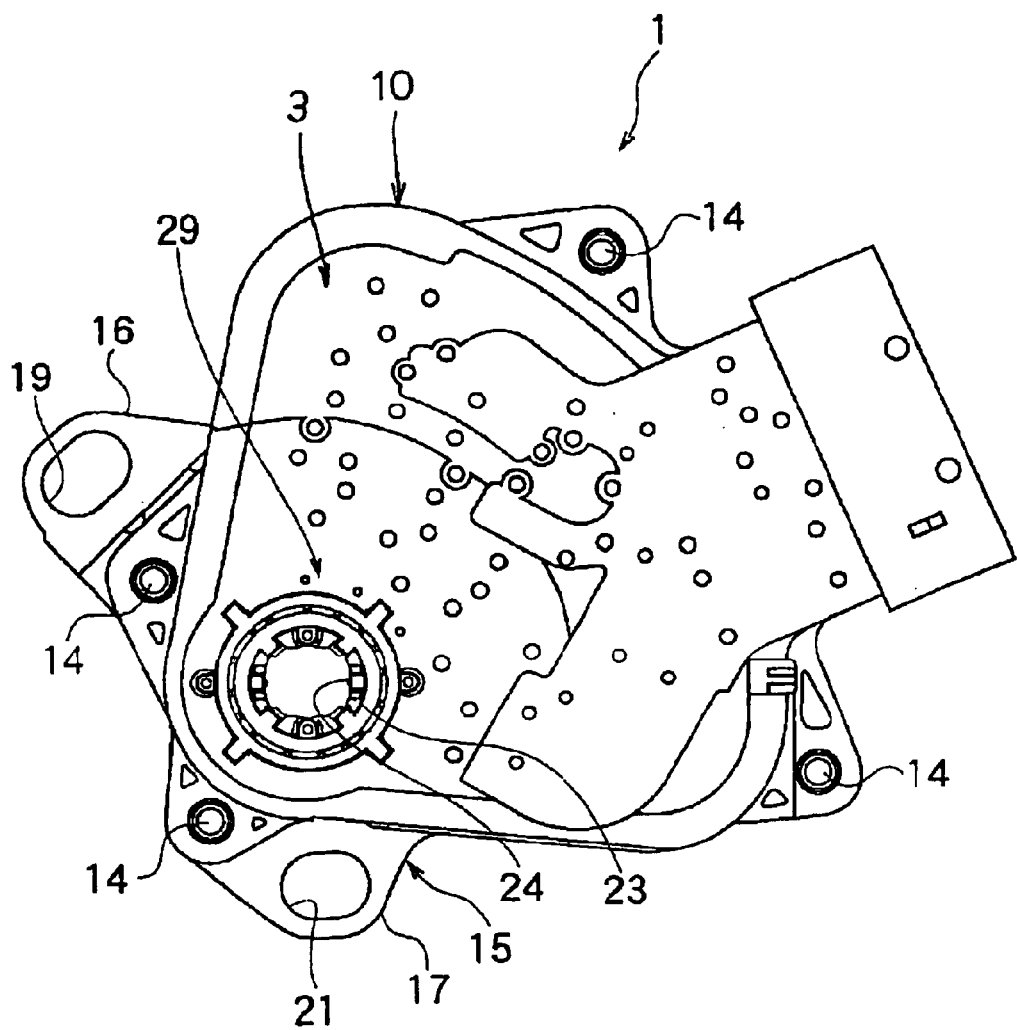
FIG. 1 is a top plan view of an inhibitor switch according to one embodiment of the present invention.
Figure 2:
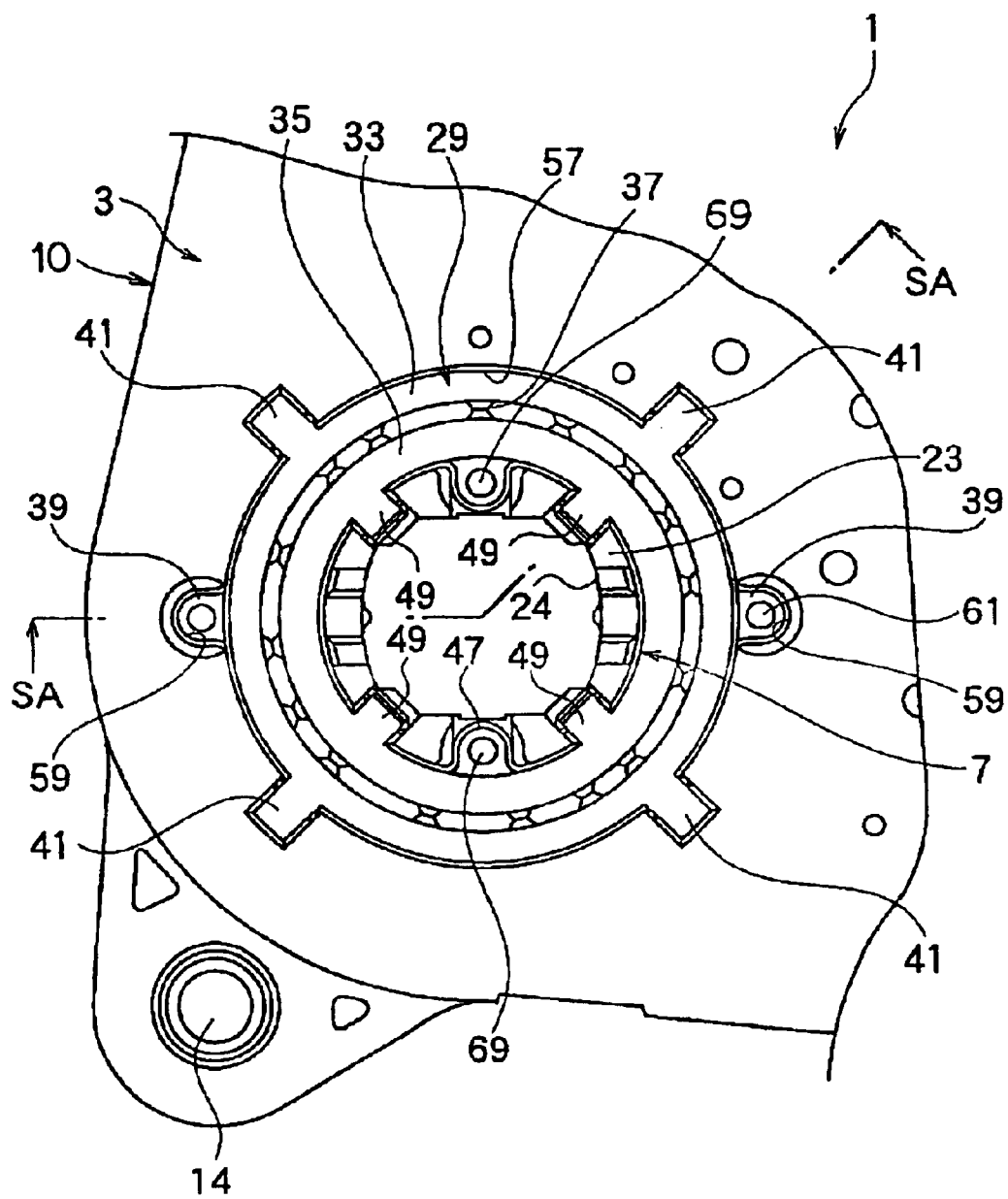
FIG. 2 is an enlarged top plan view of an essential portion of the inhibitor switch according to one embodiment.
Figure 3:
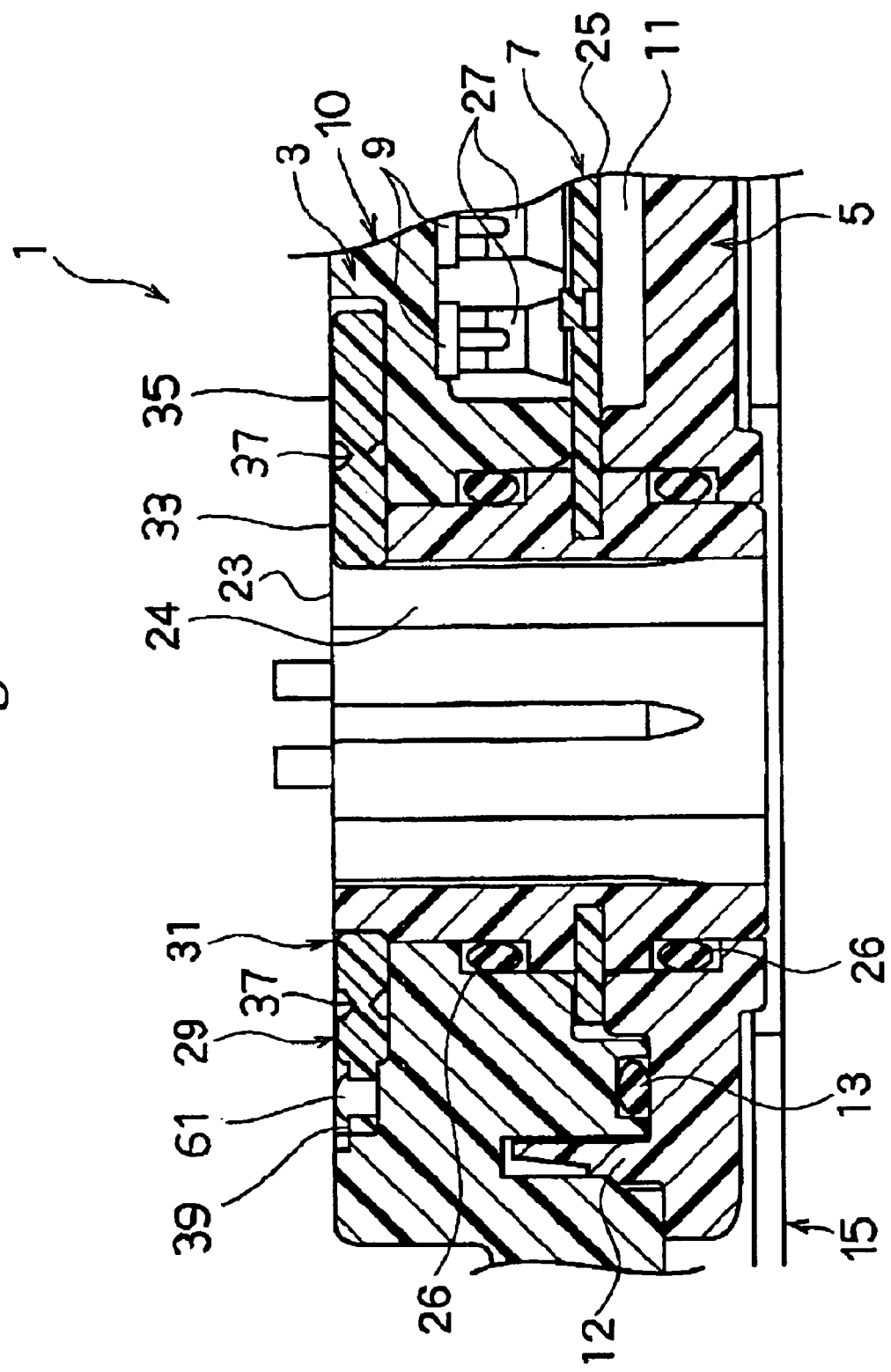
FIG. 3 is a sectional view taken in arrows 3A—3A of FIG. 2 according to one embodiment.

FIG. 1 is a top plan view of an inhibitor switch 1 to which the invention is applied; FIG. 2 is an enlarged top plan view of an essential portion; and FIG. 3 is a sectional view taken in arrows 3A—3A of FIG. 2. As shown in FIGS. 1 to 3, an inhibitor switch 1 is provided with a terminal block 3, a case 5 and a moving block 7.

The terminal block 3 is equipped with a plurality of stationary contacts 9, as shown in FIG. 3. To the terminal block 3, there is bonded the case 5 to construct a switch housing 10, in which a contact accommodating chamber 11 is formed. The terminal block 3 and the case 5 are bonded at a fused portion 12, for example, by a high-frequency fusing method. Between the terminal block 3 and the case 5, moreover, there is sandwiched a rubber seal member 13 such as an O-ring. The case 5 is additionally thermally fastened and fixed on a bracket 15 at four additionally fastened portions 14. From two portions of the bracket 15, there are protruded two fixing protrusions 16 and 17, in which fastening slots 19 and 21 are individually formed.

The moving block 7 is composed of a boss portion 23 and a contact supporting disc 25. The boss portion 23 is rotatably supported by the terminal block 3 and the case 5. Between the boss portion 23, and the terminal block 3 and the case 5, there is sandwiched a seal member 26 made of rubber such as an O-ring. In the boss portion 23, there is formed a fitting hole 24 having a width across the flats thereof. This fitting hole 24 fits on the manual shaft of an automatic transmission. The contact supporting disc 25 is extended into the contact accommodating chamber 11. A plurality of moving contacts 27 are supported on the contact supporting disc 25.

The shift position of the automatic transmission may also be electrically detected from the rotational position relationship between the stationary contacts 9 and the moving contacts 27 according to the rotation of the manual shaft.

The positioning structure of this inhibitor switch 1 is equipped with a tack-fastening member 29, as shown in FIG. 1, FIG. 2 and FIG. 3. The tack-fastening member 29 fastens the terminal block 3 and the moving block 7 temporarily at a specific shift position of the automatic transmission, e.g., at a corresponding rotational position for detecting a neutral position (or N-position), for example. Therefore, the terminal block 3 is provided with an accommodation recess 31, in which the tack-fastening member 29 is accommodated.

Figure 4:
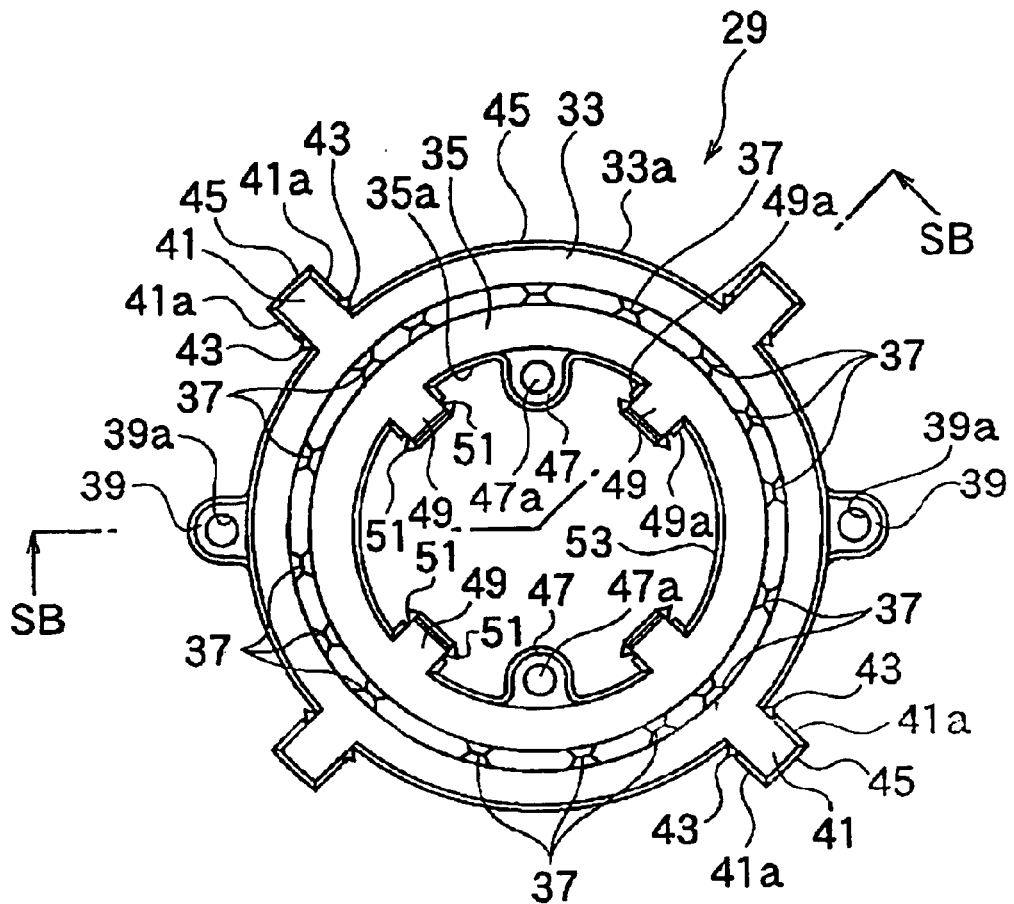
FIG. 4 is a top plan view of a tack-fastening member according to one embodiment.
Figure 5:
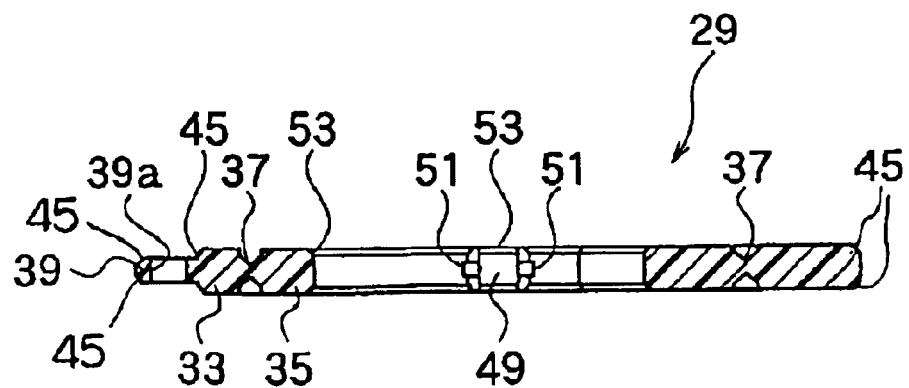
FIG. 5 is a sectional view taken in arrows 5B—5B of FIG. 4 according to one embodiment.

The tack-fastening member 29 is shown in FIG. 4 and FIG. 5. FIG. 4 is a top plan view of the tack-fastening member 29, and FIG. 5 is a sectional view taken in arrows 5B—5B of FIG. 4.

As shown in FIG. 4 and FIG. 5, the tack-fastening member 29 is made of a resin such as polyphenylene sulfide (PPS). However, the material for the tack-fastening member 29 can be variously selected according to a later-described breaking torque. The tack-fastening member 29 is made so as to be symmetrical in the thickness direction so that it has no directivity in the thickness direction.

The tack-fastening member 29 is equipped with a first fixed portion 33, a second fixed portion 35 and easily broken portions 37 connecting the first and second fixed portions 33 and 35.

The first and second fixed portions 33 and 35 are formed into such ring shapes as are generally concentric with the fitting hole 24 of the moving block 7. The first fixed portion 33 is fixed on the side of the terminal block 3, and the second fixed portion 35 is fixed on the side of the moving block 7.

From the outer circumference of the first fixed portion 33, there are protruded a pair of outer fastening portions 39 for fastening/fixing purposes. The outer fastening portions 39 are made thinner than, that is, one half as thick as the first fixed portion 33. In the individual outer fastening portions 39, there are formed through-holes 39a. On the outer circumference of the first fixed portion 33, there are also formed a plurality of, e.g., four outer press-fit portions 41 which are protruded radially outward. On the root side of each outer press-fit portion 41, there are protruded a pair of press-fitting protrusions 43 on the two circumferential sides. The spacing between the leading ends of the protrusions 43 is made slightly larger than the width of the outer press-fit portion 41 so that it contributes to the later-described press-fitting. The first fixed portion 33 is wholly chamfered at 45. These chamfers 45 make it easy to mount the first fixed portion 33 on the side of the terminal block 3.

The second fixed portion 35 is made as thick as the first fixed portion 33, and inner fastening portions 47 for fastening/fixing purposes are protruded from the inner circumference of the second fixed portion 35. The inner fastening portions 47 are made thinner than, that is, as thick as the second fixed portion 35. The inner fastening portions 47 are arranged with a shift of about 90 degrees with respect to the outer fastening portions 39 of the first fixed portion 33. Therefore, the tack-fastening member 29 can be reliably fixed by the outer fastening portions 39 and the inner fastening portions 47, which are offset by about 90 degrees. In the inner fastening portions 47, there are formed through-holes 47a. On the inner circumference of the second fixed portion 35, there are formed a plurality of, e.g., four inner press-fit portions 49 which are protruded radially inward. On the leading end side of each inner press-fit portion 49, there are protruded a pair of press-fitting protrusions 51 on the two circumferential sides. The spacing between the leading ends of the protrusions 51 is made slightly larger than the width of the inner press-fit portion 49 so that it contributes to the later-described press-fitting. The second fixed portion 35 is wholly chamfered at 53 on its inner circumferential side. These chamfers 53 make it easy to mount the second fixed portion 35 on the side of the moving block 7.

The protrusions 43 are arranged on the root sides of the individual outer press-fit portions 41, and the protrusions 51 are arranged on the leading end sides of the individual inner press-fit portions 49. This is because the individual protrusions 43 and 51 are arranged as close to the center of rotation as possible. Thus, according to the construction of the individual protrusions 43 and 51, the dislocations in the circumferential directions can be dramatically reduced, even if the individual protrusions 43 and 51 are non-uniformly crushed when press-fitted, so that the accuracy dispersions can be drastically reduced.

Figure 6:
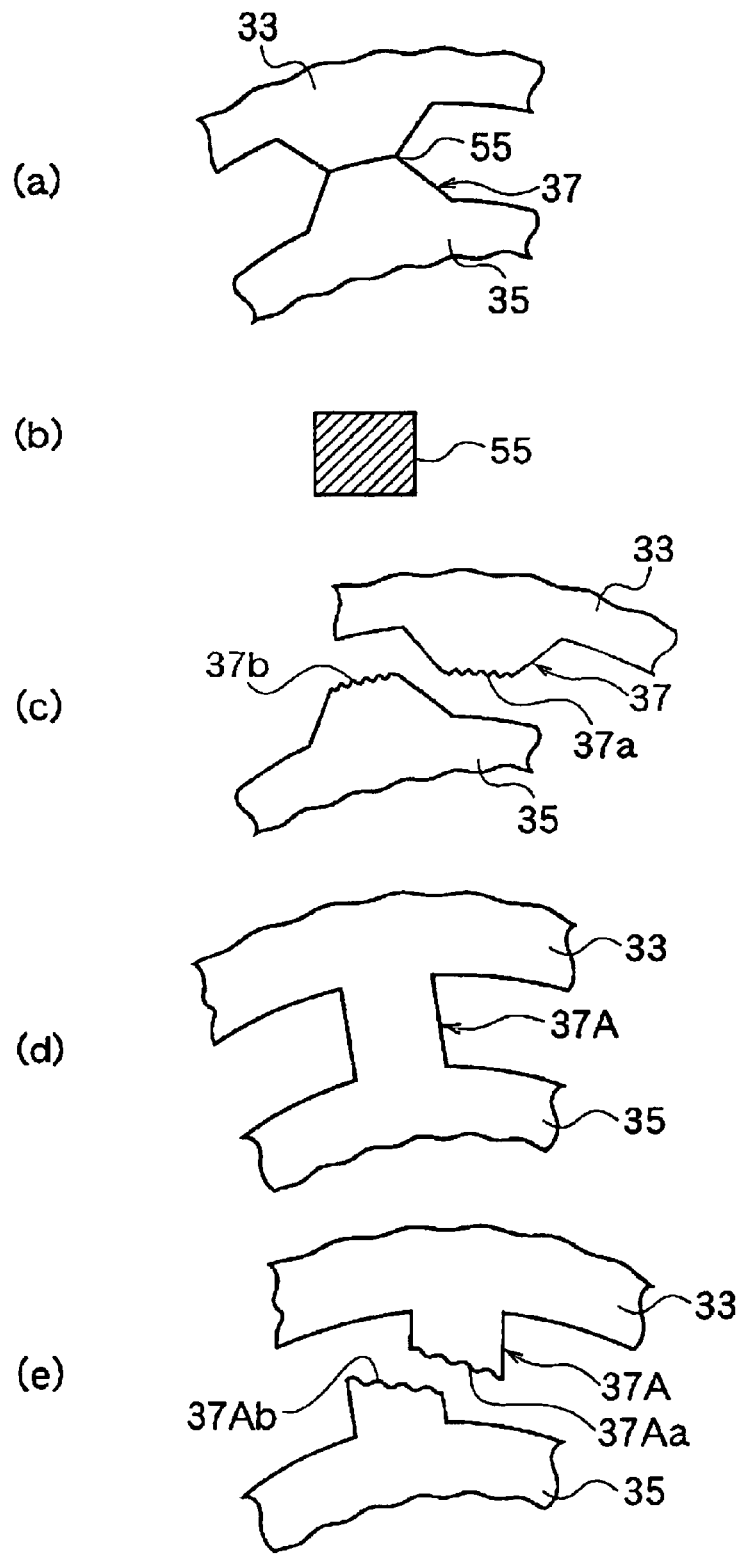

The easily broken portions 37 are provided in plurality at unequal spacings in the circumferential directions between the first and second fixed portions 33 and 35. The easily broken portions 37 are formed, as shown in FIG. 5 and FIG. 6A. FIG. 6A is an enlarged top plan view of an essential portion showing the easily broken portion; FIG. 6B is a sectional view of a stress concentrated portion; FIG. 6C is an enlarged top plan view of an essential portion after the easily broken portion was broken; FIG. 6D is an enlarged top plan view of an essential portion showing an easily broken portion having no stress concentrated portion; and FIG. 6E is an enlarged top plan view of an essential portion showing the stress concentrated portion of the structure shown in FIG. 6D, after being broken.

As shown in FIG. 5 and FIGS. 6A and 6B, the easily broken portion 37 is gradually thinned in the thickness directions (normal to the Drawing) and in the circumferential directions from both the first fixed portion 33 and the second fixed portion 35 to the others, to form a stress concentrated portion 55 in its intermediate portion. The stress concentrated portion 55 is sectionally formed into a rectangular sectional shape, as shown in FIG. 6B, because its molding structure is simplified. However, the sectional shape of the stress concentrated portion 55 should not be limited to the rectangular sectional shape, but a circular section or another could be arbitrarily selected. Moreover, the easily broken portion 37 is formed by thinning it gradually in both the thickness directions and the circumferential directions. However, the stress concentrated portion 55 could also be formed by thinning it gradually only in the thickness or circumferential directions.

The breaking strength of the easily broken portion 37 is set lower than the crushing strength against the press-fittings of the protrusions 43 of the outer press-fit portions 41 into outer press-fitting accommodating portions 63 and the press-fittings of the protrusions 51 of the inner press-fit portions 49 into inner press-fitting accommodating portions 71. In other words, the crushing strength of the individual press-fit portions is set higher than that of the easily broken portion 37.

Figure 7:
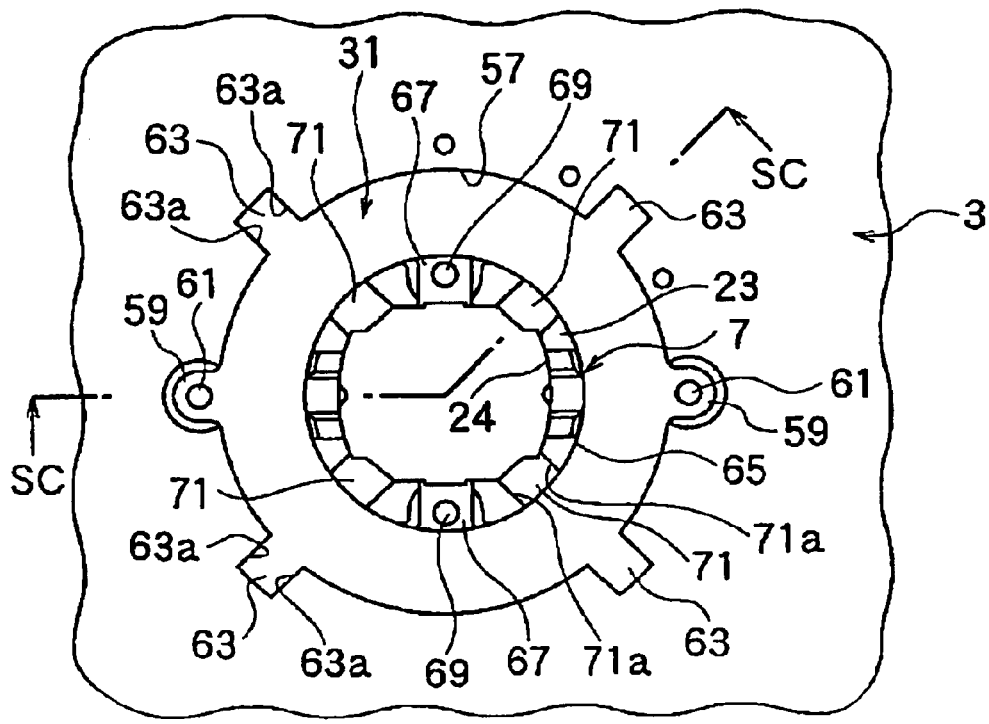
FIG. 7 is an enlarged top plan view of an essential portion showing accommodating portions according to one embodiment.
Figure 8:
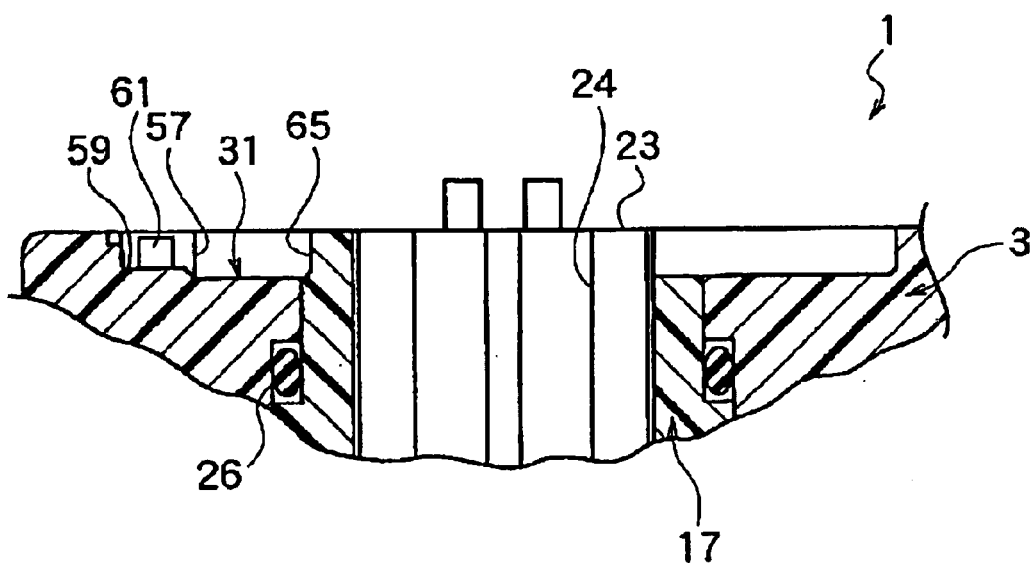
FIG. 8 is a sectional view taken in arrows 8C—8C of FIG. 7 according to one embodiment.
Figure 9:
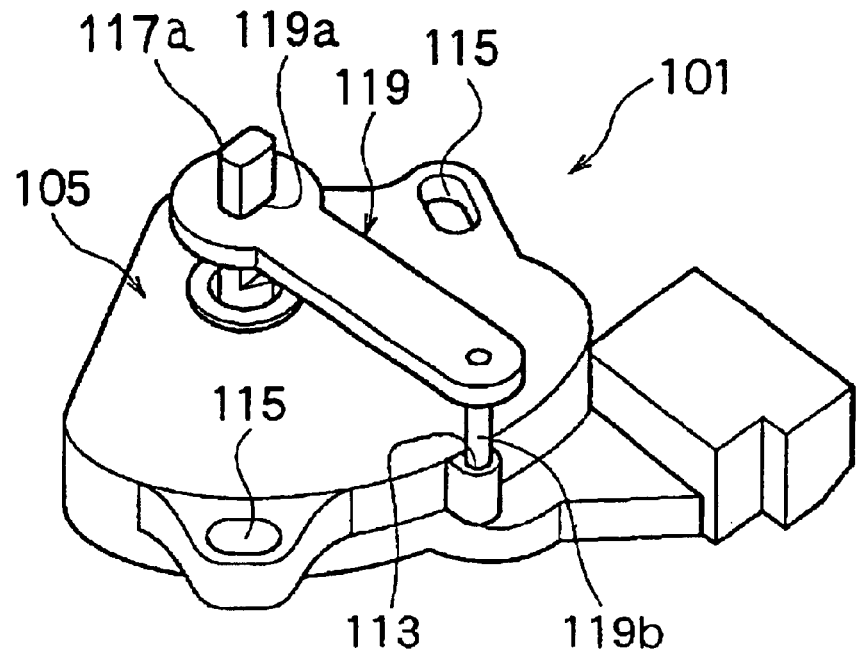
FIG. 9 is a perspective view of an inhibitor switch according to a prior art example.
Figure 10:
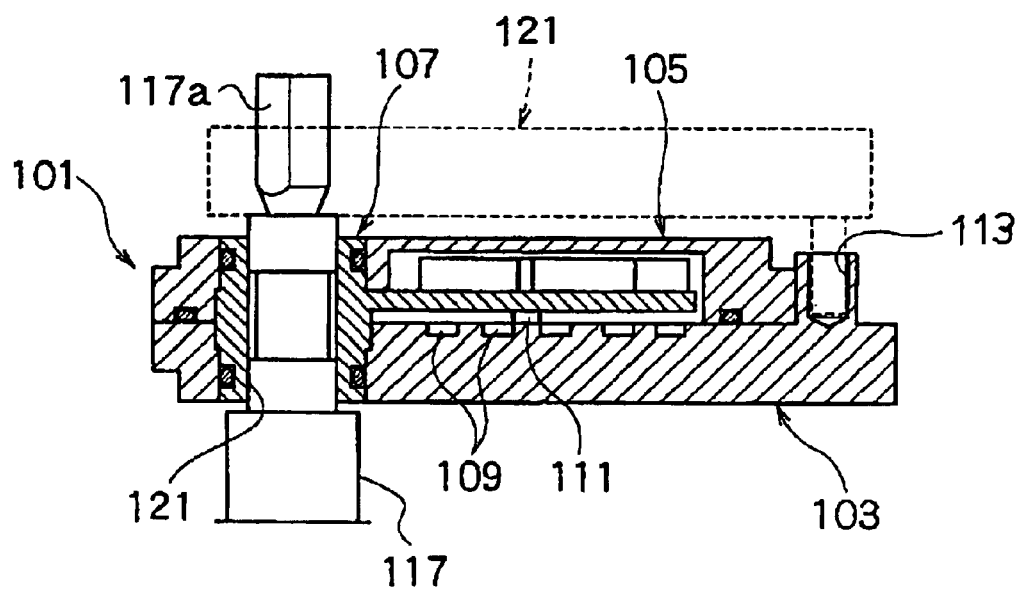
FIG. 10 is a sectional view of the inhibitor switch according to the prior art example.

The accommodating portion 31 and its periphery are made as shown in FIG. 7 and FIG. 8. FIG. 7 is a top plan view showing the accommodating portion 31 and its periphery, and FIG. 8 is an enlarged sectional view taken in arrows SC—SC of FIG. 7. As shown in FIG. 7 and FIG. 8, the accommodating portion 31 is formed between an inward circumference 57 and an outward circumference 65. The inward circumference 57 is formed on the side of the terminal block 3 and is formed into a circular shape concentric to the fitting hole 24 of the moving block 7. The first fixed portion 33 is closely fitted at its outer circumference in the inward circumference 57, which abuts the outer circumference of the first fixed portion 33. The outward circumference 65 is formed on the side of the moving block 7 and is formed into a concentric circular shape as the outer circumference of the boss portion 23. The second fixed portion 35 is closely fitted at its inner circumference on the outward circumference 65, which abuts the inner circumference of the second fixed portion 35.

On the outer circumference of the accommodating recess 31, there are formed a pair of outer fastening accommodating portions 59. These outer fastening accommodating portions 59 accommodate the outer fastening portions 39 and are made slightly shallower than the accommodating recess 31. In the outer fastening and accommodating portions 59, there are protruded protrusions 61 for additional thermal fastening purposes.

On the outer circumferential side of the accommodating recess 31, there are further formed the outer press-fitting accommodating portions 63. Four outer press-fitting accommodating portions 63 are provided in order to correspond to the number of outer press-fit portions 41. Two circumferential sides of the outer press-fitting accommodating portion 63 are formed into engaging faces 63a. When the outer press-fit portions 41 are accommodated in the outer press-fitting accommodating portions 63, the engaging faces 63a closely abut the circumferential side portions 41 a of the outer press-fit portions 41 and press-fit the protrusions 43 between the engaging faces 63a.

The boss portion 23 is equipped with a pair of inner fastening accommodating portions 67. These inner fastening accommodating portions 67 accommodate the inner fastening portions 47 of the tack-fastening member 29. In the inner fastening accommodating portions 67, there are formed protrusions 69 for additionally thermally fastening the protrusions 69.

In the boss portion 23, there are further formed the inner press-fitting accommodating portions 71. These inner press-fitting accommodating portions 71 are provided in four to correspond to the inner press-fit portions 49 of the tack-fastening member 29. On the two circumferential sides of each inner press-fitting accommodating portion 71, there are formed engaging faces 71a. When the inner press-fit portions 49 are accommodated in the inner press-fitting accommodating portions 71, the engaging faces 71a abut the circumferential side portions 49a of the inner press-fit portions 49 closely and press-fit the protrusions 51 between the engaging faces 71a.

The tack-fastening operations of the terminal block 3 and the moving block 7 will now be described. These operations are performed by accommodating the tack-fastening member 29, as shown in FIG. 4 and FIG. 5, in the side of the accommodating recess 31 of FIG. 7 and FIG. 8. For this accommodation, the terminal block 3 and the moving block 7 are adjusted to a specific shift position of the automatic transmission, e.g., to a corresponding rotational position for detecting an N-position. In this state, the tack-fastening member 29 is fitted on the side of the accommodating portion 31. The tack-fastening member 29 has no directivity in its thickness direction so that it can be fitted in the accommodating recess 31 from the front or back side. Therefore, this fitting work can be easily done. By this fitting work, the outer fastening portions 39 are accommodated in the outer fastening accommodating portions 59, and the inner fastening portions 47 are accommodated in the inner fastening accommodating portions 67. The fastening protrusions 61 and 69, which have additionally been thermally fastened, are fitted in the through holes 39a and 47a of the outer fastening portions 39 and the inner fastening portions 47. By additionally thermally fastening the protrusions 61 and 69, the outer fastening portions 39 are fastened and fixed in the outer fastening accommodating portions 59, and the inner fastening portions 47 are fastened and fixed in the inner fastening accommodating portions 67.

Simultaneously with this, the outer press-fit portions 41 of the first fixed portion 33 are accommodated in the outer press-fitting accommodating portions 63, and the inner press-fit portions 49 of the second fixed portion 35 are accommodated in the inner press-fitting accommodating portions 71. At this time, these accommodations can be easily effected by the chamfers 45 and 53 of the tack-fastening member 29. At these accommodations, the protrusions 43 of the outer press-fit portions 41 are press-fit between the engaging faces 63a of the outer press-fitting accommodating portions 63, and the protrusions 51 of the inner press-fit portions 49 are press-fit between the engaging faces 71a of the inner press-fitting accommodating portions 71.

By these operations, the tack-fastening member 29 can be accommodated without any looseness in the accommodating recess 31. In this case, the outer press-fitting accommodating portions 63, the outer fastening accommodating portions 59, the inner press-fitting accommodating portions 71, the inner fastening accommodating portions 67 and the accommodating recess 31 are opened to the outer faces of the terminal block 3 and the moving block 7 so that the tack-fastening member 29 can be easily mounted.

This tack-fastened state is shown in FIG. 1, FIG. 2 and FIG. 3. In this tack-fastened state, the inhibitor switch 1 is assembled with the automatic transmission. Specifically, the moving block 7 in the tack-fastened state is fitted at its fitting hole 24 on the manual shaft at a specific shift position, such as at the N-position. Next, bolts are inserted into the slots 19 and 21 of the bracket 15 to fasten and fix it on the housing side of the automatic transmission. As a result, the inhibitor switch 1 is completely mounted.

At this mounting time, the bracket 15 on the side of the case 5 may invite an assembling error for each product with respect to the accurate positioning of the terminal block 3 and the moving block 7 by the tack-fastening member 29. The dislocation of the bracket 15 with respect to the automatic transmission due to such error can be absorbed in the slots 19 and 21. Specifically, the fitting hole 24 of the moving block 7 is fitted on the manual shaft, and the bolts are inserted into the slots 19 and 21 of the bracket 15 and are fastened as they are. As a result, the accurate positioning can be made to the N-position of the manual shaft of the automatic transmission with respect to the temporary fixing state of the N-position of the terminal block 3 and the moving block 7.

After the inhibitor switch 1 is assembled, the manual shaft rotates accordingly as the shift lever is moved to be inspected. At this time, the individual easily broken portions 37 are easily broken at the set torque. These easily broken portions 37 are provided in plurality in the circumferential directions between the first and second fixed portions 33 and 35. Therefore, the easily broken portions 37 can individually be made so thin that they can be reliably broken at the set torque while suppressing their flexibility.

The breaking strengths against the press-fittings of the protrusions 43 of the outer press-fit portions 41 into outer press-fitting accommodating portions 63 and the press-fittings of the protrusions 51 of the inner press-fit portions 49 into inner press-fitting accommodating portions 71 are set higher than the breaking strength of the easily broken portions 37. As a result, the easily broken portions 37 can be reliably broken without inviting any looseness in the press-fittings, while fixing the tack-fastening member 37 reliably on the terminal block 3 and the moving block 7 by the press-fittings.

When the easily broken portions 37 are broken, the first fixed portion 33 and the second fixed portion 35 are individually deformed inward. However, the first and second fixed portions 33 and 35 are supported and prevented from being deformed by the inward circumference 57 and the outward circumference 65, so that the easily broken portions 37 can be accurately broken at the set torque by transmitting the breaking force reliably to it.

The outer and inner press-fit portions 41 and 49 are protruded at positions different from those of the outer and inner fastening portions 39 and 47 so that they can be restrained from the thermal influences of the fastenings of the outer fastening portions 39 and the inner fastening portions 47, which have additionally been thermally fastened, and so that the outer press-fit portions 41 and the inner press-fit portions 49 can avoid the looseness due to the thermal influences. Therefore, the easily broken portions can be reliably broken.

The broken state is shown in FIG. 6C.

When the manual shaft rotates, as described hereinbefore, the second fixed portion 35 rotates with respect to the first fixed portion 33. As a result, a shearing force in the rotational direction acts on the easily broken portion 37. At this time, the shearing stress is concentrated at the stress concentrated portion 55 of the easily broken portion so that the stress concentrated portion 55 is broken, as shown in FIG. 6C. These broken faces 37a and 37b can be extended in the circumferential directions by setting the stress concentrated portion 55.

After being broken, the portion on the side of the broken face 37a and the portion on the side of the broken face 37b individually shrink according to the properties of the resin so that the broken faces 37a and 37b leave each other slightly.

After shipping, therefore, when the user operates the shift lever to make a speed change, the manual shaft rotates so that the first fixed portion 33 rotates with respect to the second fixed portion 35. At this time, the broken faces 37a and 37b can be prevented from abutting against each other.

When the stress-concentrated portion is not formed at an easily broken portion 37A, as shown in FIG. 6D, on the contrary, broken faces 37Aa and 37Ab may be inclined, as shown in FIG. 6E. In this case, at the rotating time of the manual shaft, the broken faces 37Aa and 37Ab are liable to abut against each other to invite the fluctuation of the operation torque. By providing the aforementioned stress concentrated portion 55, therefore, the broken faces 37a and 37b can be formed in the circumferential directions, as shown in FIG. 6C, to prevent the fluctuation of the operation torque without fail.

Even if the broken faces 37a and 37b are slightly inclined to abut against each other at the rotating time, moreover, the easily broken portions 37 are provided in plurality at different spacings so that they can be made to only abut once at a single place while being prevented from simultaneously abutting during of rotation of 360°. Therefore, cases in which the individual broken faces 37a and 37b all abut, or cases when none of these faces abut, are not repeated so that the operation torque can be suppressed from fluctuating.

It is possible to adopt the structure of the easily broken portion 37A, as shown in FIG. 6D. Even if the broken faces 37Aa and 37Ab might be inclined in this case, as shown in FIG. 6E, the easily broken portions 37A can be made to abut one by one in the rotation by providing them at different spacings in the circumferential directions, so that all of them can be prevented from simultaneously abutting to suppress the fluctuation of the operation torque.

After the tack-fastening member 29 is also broken, the first fixed portion 33 keeps the state in which it is fixed on the side of the terminal block 3 by additionally thermally fastening it, and the second fixed portion 35 keeps the state in which it is fixed on the side of the moving block 7 by additionally thermally fastening it. Therefore, the fixed portions 33 and 35 can be prevented from coming out to eliminate accumulation of dust. Even if the tack-fastening member 29 should come out after being broken, it would go out of the inhibitor switch 1 to keep the inhibitor switch 1 free from any trouble.

Thus, at the time of mounting the inhibitor switch 1, no special positioning work using a jig or the like is required, and the inhibitor switch 1 can be accurately assembled in an extremely easy manner with the automatic transmission.

Here, in the foregoing embodiment, the tack-fastening member 29 is mounted in advance between the terminal block 3 and the moving block 7. However, the tack-fastening construction can be modified by mounting the tack-fastening member 29 in advance between the case 5 and the moving block 7 and between both the case 5 and the terminal block 3 and the moving block 7. Moreover, the outer and inner fastening portions 39 and 47 are additionally thermally fastened but may be fastened by screws or the like. The stress concentrated portion 55 can also be formed by forming a circumferential groove at the easily broken portion 37A of FIG. 6D.

What is claimed is:

1. A positioning structure of an inhibitor switch including a switch housing having a terminal block having stationary contacts; and a moving block fitted on a manual shaft of an automatic transmission and having a fitting hole and moving contacts for rotating with respect to the terminal block, the inhibitor switch being fixed on the housing of the automatic transmission for detecting the shift position of the automatic transmission electrically from a rotational position corresponding to a relationship between the stationary contacts and the moving contacts in accordance with the rotation of the manual shaft of the automatic transmission, which comprises:

a tack-fastening member fastened between the terminal block and the moving block in advance, before the inhibitor switch is fixed on the automatic transmission, at corresponding rotation positions for detecting a specific shift position of the automatic transmission and adapted to be broken at a set torque;

wherein the tack-fastening member is made of a resin and includes a first fixed portion to be fixed on the side of the terminal block, a second fixed portion to be fixed on the side of the moving block, and an easily broken portion for connecting the first and second fixed portions;

the first and second fixed portions are formed into a ring shape generally concentric to the fitting hole of the moving block; and the easily broken portion is provided in plurality in circumferential directions between the first and second fixed portions.

2. A positioning structure of an inhibitor switch according to claim 1, wherein the first fixed portion is equipped with an outer press-fit portion; the second fixed portion is equipped with an inner press-fit portion; the terminal block is equipped with an outer press-fitting accommodating portion for press-fitting the outer press-fit portion; the moving block is equipped with an inner press-fitting accommodating portion for press-fitting the inner press-fit portion; and each of the press-fit portions has a crushing strength set higher than the strength of the easily broken portions.

3. A positioning structure of an inhibitor switch according to claim 2, wherein the terminal block is equipped with an inward circumference for confronting the outer circumference of the ring-shaped first fixed portion; the moving block is equipped with an outward circumference for confronting the inner circumference of the ring-shaped second fixed portion; and an accommodating recess for accommodating the first and second fixed portions is formed between the inward circumference and the outward circumference.

4. A positioning structure of an inhibitor switch according to claim 2 or 3, wherein the first fixed portion is equipped separately of the outer press-fit portion with outer fastening portions to be fastened and fixed on the side of the terminal block; the second fixed portion is equipped separately of the inner press-fit portion with inner fastening portions to be fastened and fixed on the side of the moving block; the outer fastening portions are thermally additionally fastened and fixed on the side of the terminal block; and the inner fastening portions are thermally additionally fastened and fixed on the side of the moving block.

5. A positioning structure of an inhibitor switch according to claim 4, wherein the easily broken portions are interposed in plurality at different spacings in the circumferential directions between the first and second fixed portions.

6. A positioning structure of an inhibitor switch according to claim 4, wherein the easily broken portions are gradually thinned from both of the first fixed portion and the second fixed portion to the others to form stress-concentrated portions at their intermediate portions.

7. A positioning structure of an inhibitor switch according to claim 3, wherein the outer press-fitting accommodating portions, the inner press-fitting accommodating portions and the accommodating recess are opened to the outer faces of the terminal block and the moving block.

8. A positioning structure of an inhibitor switch according to claim 7, wherein the easily broken portions are interposed in plurality at different spacings in the circumferential directions between the first and second fixed portions.

9. A positioning structure of an inhibitor switch according to claim 7, wherein the easily broken portions are gradually thinned from both of the first fixed portion and the second fixed portion to the others to form stress-concentrated portions at their intermediate portions.

10. A positioning structure of an inhibitor switch according to any of claim 1, 2, or 3, wherein the easily broken portions are interposed in plurality at different spacings in the circumferential directions between the first and second fixed portions.

11. A positioning structure of an inhibitor switch according to any of claim 1, 2 or 3, wherein the easily broken portions are gradually thinned from both of the first fixed portion and the second fixed portion to the others to form stress-concentrated portions at their intermediate portions.

12. A positioning structure of an inhibitor switch according to claim 10, wherein the easily broken portions are gradually thinned from both of the first fixed portion and the second fixed portion to the others to form stress-concentrated portions at their intermediate portions.

* * * * *